US008978060B2

(12) United States Patent
Bakar et al.

(10) Patent No.: US 8,978,060 B2
(45) Date of Patent: Mar. 10, 2015

(54) SYSTEMS, METHODS, AND MEDIA FOR PRESENTING ADVERTISEMENTS

(71) Applicants: Majd Bakar, San Jose, CA (US); Shishir Mehrotra, Los Altos, CA (US); Rishi Chandra, Los Altos, CA (US)

(72) Inventors: Majd Bakar, San Jose, CA (US); Shishir Mehrotra, Los Altos, CA (US); Rishi Chandra, Los Altos, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/844,050

(22) Filed: Mar. 15, 2013

(65) Prior Publication Data

US 2014/0282695 A1    Sep. 18, 2014

(51) Int. Cl.
| H04N 7/10 | (2006.01) |
| H04N 7/025 | (2006.01) |
| H04N 21/81 | (2011.01) |
| H04N 21/44 | (2011.01) |

(52) U.S. Cl.
CPC ....... *H04N 21/812* (2013.01); *H04N 21/44016* (2013.01)
USPC ............................................. 725/32; 725/22

(58) Field of Classification Search
CPC ............................................. H04N 21/23424
USPC ................................... 725/32, 33, 34, 35, 36
See application file for complete search history.

(56) References Cited

U.S. PATENT DOCUMENTS

| 6,427,020 B1 * | 7/2002 | Rhoads ......................... 382/100 |
| 7,587,601 B2 | 9/2009 | Levy et al. |
| 7,930,714 B2 | 4/2011 | Konig et al. |
| 8,141,111 B2 * | 3/2012 | Gilley et al. ..................... 725/32 |
| 2003/0192060 A1 * | 10/2003 | Levy .............................. 725/133 |
| 2007/0283384 A1 * | 12/2007 | Haeuser et al. ................. 725/34 |
| 2010/0153993 A1 | 6/2010 | Konig et al. |
| 2010/0229205 A1 * | 9/2010 | Hakusui .......................... 725/62 |
| 2012/0072730 A1 | 3/2012 | Winograd et al. |
| 2012/0150903 A1 | 6/2012 | Davis et al. |

FOREIGN PATENT DOCUMENTS

JP    2003114841    4/2003

OTHER PUBLICATIONS

Alcatel-Lucent, "Empowering IPTV Providers to Generate Advertising Revenue: Enabling Linear Ad Insertion within Alcatel-Lucent's Triple Play Service Selivery Architecture", Technical Report, Mar. 13, 2009, pp. 1-19, available at: resources.alcatel-lucent.com/?cid=131214.
Society of Cable Telecommunications Engineers, "Digital Program Insertion Cueing Message for Cable", Technical Report, ANSI/SCTE 35 2007, Jan. 2007, pp. 1-41.
International Search Report and Written Opinion in International Patent Application No. PCT/US2014/028075, filed Mar. 14, 2014, mailed Nov. 10, 2014.

* cited by examiner

*Primary Examiner* — Benjamin R Bruckart
*Assistant Examiner* — Tien M Nguyen
(74) *Attorney, Agent, or Firm* — Byrne Poh LLP (57) ABSTRACT

Systems, methods, and media for presenting advertisements are provided. In some implementations, systems for presenting advertisements are provided, the systems comprising: at least one hardware processor that: receives media content containing a video portion and/or an audio portion; determines whether a watermark is embedded in at least one of the video portion and/or the audio portion of the media content; and if it is determined that the watermark is embedded in the at least one of the video portion and/or the audio portion of the media content: identifies a payload in the watermark; receives an advertisement selected at least in part based on the payload; and causes the advertisement to be presented instead of the media content.

21 Claims, 4 Drawing Sheets

SYSTEMS, METHODS, AND MEDIA FOR PRESENTING ADVERTISEMENTS

TECHNICAL FIELD

The disclosed subject matter relates to systems, methods, and media for presenting advertisements.

BACKGROUND

Advertising accounts for a large portion of the revenue of television content publishers. Despite its importance, however, the distribution of television advertisements may be less efficient than the distribution of some other advertisements (e.g., such as website-based advertisements). In particular, content publishers, such as television channels, tend to distribute advertisements in accordance with Designated Market Areas (DMAs). Under this approach, all users in a given DMA region are presented the same advertising regardless of their specific interests. Advertisements presented in this manner may be less likely to resonate with viewers on an individual level than website-based advertisements.

Furthermore, the mechanisms for distribution of television advertisements that are presently employed by content publishers and content distributors typically leave certain playback devices, such as television sets and streaming media players, out of the advertising process.

Accordingly, new systems, methods, and media for presenting advertisements are desirable.

SUMMARY

Systems, methods, and media for presenting advertisements are provided. In some implementations, systems for presenting advertisements are provided, the systems comprising: at least one hardware processor that: receives media content containing a video portion and/or an audio portion; determines whether a watermark is embedded in at least one of the video portion and/or the audio portion of the media content; and if it is determined that the watermark is embedded in the at least one of the video portion and/or the audio portion of the media content: identifies a payload in the watermark; receives an advertisement selected at least in part based on the payload; and causes the advertisement to be presented instead of the media content.

In some implementations, methods for presenting advertisements are provided, the methods comprising: receiving media content containing a video portion and/or an audio portion; determining, using a hardware processor, whether a watermark is embedded in at least one of the video portion and/or the audio portion of the media content; and if it is determined that the watermark is embedded in the at least one of the video portion and/or the audio portion of the media content: identifying a payload in the watermark; receiving an advertisement selected at least in part based on the payload; and causing the advertisement to be presented instead of the media content.

In some implementations, non-transitory computer readable media containing computer-executable instructions that, when executed by a processor, cause the processor to perform a method for presenting advertisements are provided, the method comprising: receiving media content containing a video portion and/or an audio portion; determining, using a hardware processor, whether a watermark is embedded in at least one of the video portion and/or the audio portion of the media content; and if it is determined that the watermark is embedded in the at least one of the video portion and/or the audio portion of the media content: identifying a payload in the watermark; receiving an advertisement selected at least in part based on the payload; and causing the advertisement to be presented instead of the media content.

In some implementations, systems for presenting advertisements are provided, the systems comprising: means for receiving media content containing a video portion and/or an audio portion; means for determining whether a watermark is embedded in at least one of the video portion and/or the audio portion of the media content; means for identifying a payload in the watermark if it is determined that the watermark is embedded in the at least one of the video portion and/or the audio portion of the media content; means for receiving an advertisement selected at least in part based on the payload if it is determined that the watermark is embedded in the at least one of the video portion and/or the audio portion of the media content; and means for causing the advertisement to be presented instead of the media content if it is determined that the watermark is embedded in the at least one of the video portion and/or the audio portion of the media content.

In some implementations of these systems, the determining of whether the watermark is embedded is based on values of one or more pixels in the video portion of the media content.

In some implementations of these systems, the determining of whether the watermark is embedded is based on values of one or more audio samples in the audio portion of the media content.

In some implementations of these systems, the advertisement is selected based at least in part on an advertisement identifier in the payload.

In some implementations of these systems, the systems further comprise means for receiving the advertisement from a server.

In some implementations of these systems, the watermark indicates that the advertisement is to be presented at a start point and the means for causing the advertisement to be presented instead of the media content causes the advertisement to begin at the start point.

In some implementations of these systems, the watermark indicates that the advertisement should be being presented when the advertisement is not being caused to be presented instead of the media content, and the means for causing the advertisement to be presented instead of the media content causes the advertisement to be presented in response to the watermark.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION

In accordance with some implementations of the disclosed subject matter, mechanisms (which can include methods, systems, and media) are provided for presenting advertisements.

In some implementations, one or more mechanisms can be provided that are configured to insert one or more watermarks into media content and subsequently insert one or more advertisements into a presentation of the media content based upon detection of the one or more watermarks and/or one or more payloads of such watermarks.

The watermarks can be inserted by a watermark embedder (e.g., at a media content producer's facility, such as a television network's facility) and detected at a playback device (e.g., at a viewer's location (e.g., home)), and the advertisements can be inserted by the playback device into the presentation of the media content based upon detection of the one or more watermarks and/or the one or more payloads of such watermarks.

Watermarks can take any suitable form in some implementations. For example, a watermark can be implemented as an image, a sound, and/or as data that is embedded in the video and/or audio of the media content in such a way that the presence or the absence of the image, the sound, and/or the data is hidden from a viewer of the media content. As a more particular example, watermarks can be one or more alterations of one or more portions of video and/or audio of the media content. In some implementations, these alterations can be imperceptible to a typical human during normal presentation of the media content. These alterations can be created as an alteration of a signal representing one or more pixels of video, as an alteration of a signal representing one or more fractions of time or frequencies of audio, etc. The watermarks can be created in such a way that decode/re-encode processes on the media content do not cause the watermarks to be lost in some implementations. In some implementations, for example, the watermark can be embedded using a technology that allows the watermark to be detected in one frame of video.

The watermarks can be encoded with any suitable payload(s) in some implementations. For example, the watermarks can include any suitable information, content, instructions, criteria, etc. Such payloads can be encoded into the watermarks in any suitable manner.

The watermarks can be inserted into any suitable type of media content, such as live video content, live audio content, pre-recorded video content, pre-recorded audio content, television broadcasts, streaming media content, video-on-demand content, audio-on-demand content, radio-broadcast content, talk radio content, audio book content, news content, movies, television shows, music video programs, cartoons, sporting events, political coverage, etc.

The watermarks can be inserted into any suitable location in the media content. For example, the watermarks can be inserted into one or more frames of video and/or samples of audio of the media content. In some embodiments, a single watermark can exist completely in a single frame of video and/or samples of audio of the media content, or can span multiple frames of video and/or samples of audio of the media content. In some embodiments, more than one watermark can be presented in a single frame of video and/or a single sample of audio.

The watermarks, and their manner of insertion into media content, can be configured for any suitable purpose. For example, the watermarks can be inserted to facilitate the insertion and presentation of advertisements at a playback device of a television viewer. More particularly, for example, an advertisement can be inserted into a presentation of the media content such that it adds to or replaces a portion of the media content, such as a portion of a non-advertising content and/or an existing advertisement present in the media content.

Figure 1:
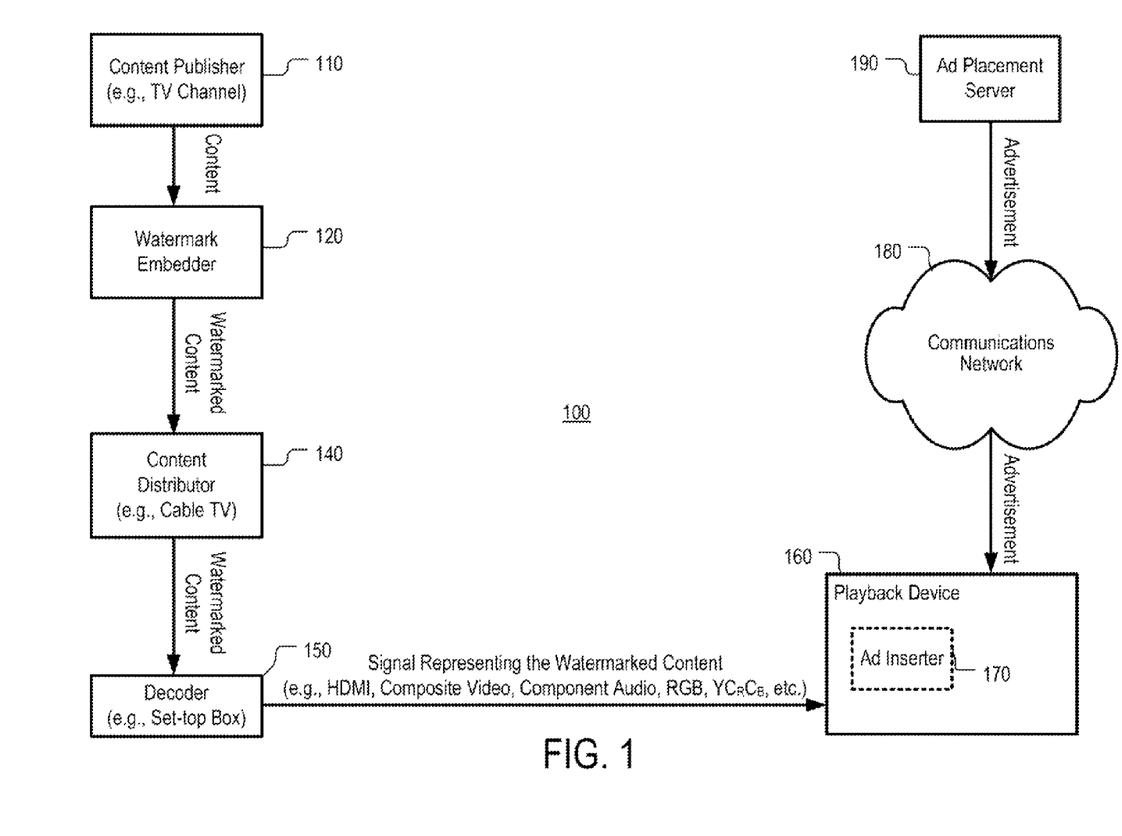
FIG. 1 is a block diagram of an example of a system for presentation of advertisements in accordance with some implementations of the disclosed subject matter.

FIG. 1 is a block diagram of an example 100 of a system for the presentation of advertisements in accordance with some implementations of the disclosed subject matter. As shown, the system can include a content publisher 110, a watermark embedder 120, a content distributor 140, a decoder 150, a playback device 160, an ad inserter 170, a communication network 180, and an ad placement server 190.

Content publisher 110 can be any suitable source of media content. Any suitable media content can be provided by content publisher 110. The content publisher can include any suitable equipment, such as a server, in some implementations. Content publisher 110 can be controlled by a content producer in some implementations. For example, the content publisher can be controlled by a content producer such as a television network or channel, a radio network or channel, a movie producer, a record label, an actor, a musician, or any other suitable entity that is involved in the production and/or supply of media content.

Watermark embedder 120 can be any suitable mechanism for inserting watermarks in media content. The watermark embedder can include any suitable equipment for inserting watermarks into media content. For example, watermark embedder 120 can include a server that is configured to receive media content from a content publisher, insert one or more watermarks into the media content, and forward the watermarked media content to a content distributor.

Content distributor 140 can be any suitable mechanism for distributing media content. For example, in some implementations, the content distributor can include any suitable one or more wired networks and wireless networks, such as local area networks (LANs), wide area network (WANs), cable television networks, satellite television networks, telephone networks, the Internet, wireless data networks (e.g., WiFi, WiMax, LTE, 3G data, 4G data, etc.), etc. Any suitable equipment and mediums can be included in content distributor 140, such as cables (e.g., coaxial cables, fiber optic cables, wires, etc.), routing equipment, amplification equipment, switching equipment, servers, transmitters, receivers, antennas (e.g., terrestrial antennas, satellite antennas/dishes, etc.), etc. In some implementations, the content distributor can be operated by a cable television provider, a local broadcaster, a satellite radio broadcaster, a telephone company, a government, and/or any other suitable entity.

Content publisher 110 and watermark embedder 120 can be coupled via any suitable mechanism, such as a local area network (LAN), a wide area network (WAN), the Internet, a one-way link (e.g., such as a satellite link), a wired connection, a wireless connection, and/or any other suitable type of connection, network, and/or link. Watermark embedder 120 and content distributor 140 can be coupled via any suitable mechanism, such as a local area network (LAN), a wide area network (WAN), the Internet, a one-way link (e.g., such as a satellite link), a wired connection, a wireless connection, and/or any other suitable type of connection, network, and/or link.

Although FIG. 1 illustrates watermark embedder 120 as being between content publisher 110 and content distributor 140, in some embodiments, the watermark embedder may located in any suitable location between the content publisher and ad inserter 170.

Decoder 150 can be any suitable mechanism for receiving watermarked media content and converting that watermarked media content for presentation by a playback device. For example, in some implementations, decoder 150 can be a cable television set-top box (STB), a cable card, an HDTV television tuner, a television tuner, a satellite integrated receiver decoder, a radio tuner, a digital television receiver, and/or any other suitable device. In some implementations, decoder 150 can be a device that is configured to receive a transport stream (e.g. an MPEG-2 transport stream that carries one or more television channels), decode the transport stream, and output a signal representing content (e.g., television content) that is encoded in the transport stream.

Playback device 160 can be any suitable one or more mechanisms for receiving and presenting media content. For example, playback device 160 can be one or more of a traditional television, a smart television, a monitor, a streaming media player, a home theater receiver, a digital video disc (DVD) player, a Blu-ray player, a digital video recorder, a media center computer, a gaming console, a television appliance, a tablet computer, a mobile phone, a laptop computer, a desktop computer, and/or any other suitable device or combination devices that is configured to receive a signal (e.g., video and/or audio) and cause the received signal (with or without processing it beforehand) to be presented (whether on the playback device or another device). In instances where a mechanism that is part of playback device 160 is a television or a monitor, that mechanism can include one or more display screens (e.g., LCD screens) and/or one or more loudspeakers. In some implementations, a mechanism that is part of playback device 160 can be configured to execute an Internet browser, a media streaming application, and/or any other suitable type of application.

Ad inserter 170 can be any suitable mechanism for presenting advertisements. For example, in some implementations, the ad inserter can include software and/or hardware for receiving watermarked media content, detecting a watermark in the watermarked media content, receiving and storing one or more advertisements, determining whether to present an advertisement, selecting an advertisement, and causing the advertisement to be presented.

Playback device 160 can be coupled to decoder 150 via any suitable mechanism, such as a local area network (LAN), a wide area network (WAN), the Internet, a one-way link (e.g., such as a satellite link), a wired connection, a wireless connection, an HDMI link, a component video link, a component audio link, a composite video link, and/or any other suitable type of connection, network, or link.

Although FIG. 1 depicts ad inserter 170 as being integrated into playback device 160, in some implementations, ad inserter 170 can be integrated into decoder 150. Furthermore, in some implementations, ad inserter 170 can be a standalone device. Although FIG. 1 depicts decoder 150 and playback device 160 as separate devices, in some implementations, they can be integrated together.

Communications network 180 can be any suitable communications network, such as a local area network (LAN), a wide area network (WAN), a cable television network, a satellite television network, a telephone network, the Internet, a wireless data network (e.g., WiFi, WiMax, LTE, 3G data, 4G data, etc.), and/or any other suitable communications network.

Although FIG. 1 depicts content distributor 140 and communication network 180 as separate mechanisms, in some implementations content distributor 140 and communication network 180 can be integrated and/or be the same mechanism.

Ad placement server 190 can any suitable mechanism for providing advertisements for presentation on a playback device and/or any other suitable information, content, instructions, criteria, etc. for controlling the presentation of advertisements. For example, ad placement server can include one or more computing devices (e.g., servers) that are configured to provide advertisements to ad inserter 170. Ad inserter 170 and ad placement server 190 can be coupled via communication network 180.

In operation, content publisher 110 can provide media content to watermark embedder 120. As described above, the media content can be any suitable media content, such as live video content, live audio content, pre-recorded video content, pre-recorded audio content, television broadcasts, streaming media content, video-on-demand content, audio-on-demand content, radio-broadcast content, talk radio content, audio book content, news content, movies, television shows, music video programs, cartoons, sporting events, political coverage, etc.

In some implementations, content publisher 110 can also provide to watermark embedder 120 any suitable information related to the presentation of advertisements. For example, this information can include information relating to the timing of the presentation, the content of the presentation, one or more locations for presenting the advertisements, the manner in which the advertisement are to be presented, etc. This information can be provided in any suitable manner. For example, this information can be provided as Digital Program Insertion (DPI) data in some implementations. The DPI data can include metadata that specifies different splice points in the content where advertisements can be inserted. The DPI data can be transmitted in the same transport stream as the media content or over a sideband channel. In some implementations, the DPI data can be formatted according to the ANSI/SCTE 35 2007 standard entitled "Digital Program Insertion Cueing Message for Cable."

Additionally or alternatively, in some implementations, content publisher 110 can also provide to watermark embedder 120 one or more watermark parameters. Any suitable parameters can be provided in some implementations. For example, the parameters can identify a position where a particular watermark is to be placed (e.g., a frame number, a position within a frame, a time point within the media content, etc.), can indicate information to be encoded into a payload of the watermark (e.g., such as an advertisement targeting keyword, a length of the advertisement, etc.), etc.

Watermark embedder 120 can receive the media content from content publisher 110 and embed one or more watermarks in it to produce watermarked media content. A watermark can take any suitable form and can be embedded in the media content by watermark embedder 120 in any suitable manner. For example, a watermark can be implemented as an image, a sound, and/or as data that is embedded in the video and/or audio of the media content in such a way that the presence or the absence of the image, the sound, and/or the data is hidden from a viewer of the media content. As a more particular example, watermarks can be one or more alterations of one or more portions of video and/or audio of the media content. In some implementations, these alterations can be imperceptible to a typical human during normal presentation of the media content. These alterations can be created as an alteration of a signal representing one or more pixels of video, as an alteration of a signal representing one or more fractions of time or frequencies of audio, etc. The watermarks can be created in such a way that decode/re-encode processes on the media content do not cause the watermarks to be lost in some implementations. In some implementations, the watermark can be embedded using a technology that allows the watermark to be detected in one frame.

The watermarks can be embedded at any suitable location in the media content. For example, in some implementations, watermarks can be embedded in one or more different frames of the content. The frame(s) in which the watermarks are embedded can be determined in any suitable manner. For example, the frame(s) in which the watermarks are embedded can be determined based on information related to the presentation of advertisements (e.g., DPI data) received from the content publisher. As another example, the frames in which the watermarks are embedded can be determined based on one or more of the watermark parameters, and/or based on any other suitable data.

In some implementations, as described above, a watermark can have a payload that encodes information related to the presentation of advertisements. The encoded information can be information that is specified by information related to the presentation of advertisements (e.g., DPI data), and/or watermark parameters, provided by content publisher 110 and/or any other suitable source (e.g., such as ad placement server 190 via a communication path not shown). For example, the encoded information can include information relating to the timing of the presentation, the content of the presentation, one or more locations for presenting the advertisements, the manner in which the advertisement are to be presented, an advertisement targeting keyword, a length of the advertisement, an advertisement identifier, a location for an advertisement in a series of advertisements to be presented together, etc. In some embodiments, all or any suitable portion of information related to the presentation of advertisements and/or watermark parameters can be provided by the watermark embedder to the ad inserter and/or the ad placement server using any suitable mechanism, such as a communication channel not shown in FIG. 1. This information and/or parameter(s) can then be used by the ad inserter and/or the ad placement server for any suitable purpose, such as advertisement targeting.

After one or more watermarks have been inserted into media content, watermark embedder 120 can provide the watermarked media content to content distributor 140, and content distributor 140 can further provide the watermarked media content to decoder 150. Content distributor 140 can provide the watermarked media content to decoder 150 in any suitable manner. For example, in some implementations, content distributor can encode the watermarked media content into a suitable encoded signal. As a more particular example, the content distributor can encode the watermarked media content into a transport stream in some implementations.

Decoder 150 can receive watermarked media content from the content distributor. The watermarked media content can be received in any suitable manner. For example, in some implementations, the watermarked media content can be received as part of an encoded signal (e.g., a transport stream). The decoder can then decode the watermarked media and feed a signal that includes the watermarked media content to playback device 160. The signal can be in any suitable format and can be provided to the playback device in any suitable manner. For example, the signal can be an HDMI signal, a component video signal, a component audio signal, a composite video signals, and/or composite audio signals. The signal can be either a digital signal or an analog signal, and the signal can be either compressed or uncompressed, in some implementations.

Playback device 160 can receive the watermarked media content and cause it to be presented. In some implementations, advertisement cues that can be indicated by one or more watermarks can be accessed without having to access an encoded content distributor signal (e.g., such as a content distributor transport stream). Because the watermarks can be embedded into the media content, rather than in accompanying signaling, the watermarks can be detected by examining the video and/or audio of the media content.

While the playback device is causing the watermarked media content to be presented, ad inserter 170 can examine the watermarked media content in order to identify one or more watermarks embedded therein. This examination of the watermarked media content can be performed in any suitable manner. For example, in some implementations, one or more portions of the video and/or audio of the watermarked media content can be examined to determine whether a watermark is hidden in it. More particularly, for example, in some implementations, pixels of video and/or frequencies of audio of one or more portions (e.g., frames) of the video and/or audio of the watermarked media content can be examined to determine whether a watermark is hidden in it Upon finding a watermark, ad inserter 170 can determine whether an advertisement is to be presented instead of the media content. This determination can be made in any suitable manner. For example, ad inserter 170 can determine whether an advertisement is to be presented based on contents of the payload of the watermark. More particularly, for example, ad inserter 170 can determine whether an advertisement is to be presented based on information in the payload relating to the timing of the presentation, the content of the presentation, one or more locations for presenting the advertisements, the manner in which the advertisement are to be presented, an advertisement targeting keyword, a length of the advertisement, etc.

If it is determined that an advertisement is to be presented, the ad inserter can determine what advertisement is to be presented and when the advertisement is to be presented. These determinations can be made in any suitable manner and on any suitable basis. For example, in some implementations, these determinations can be made based on information in the payload. More particularly, for example, the information can indicate that an advertisement is to be presented in 3.0 seconds and that an advertisement should be selected based on the geographic location of the playback device.

As another example, in some implementations, ad inserter 170 can interact with ad placement server 190 to select an advertisement based on the watermark and/or the contents of the payload of the watermark. For example, ad inserter 170 can decode the watermark and extract advertisement targeting information, such as advertisement targeting keywords, from the watermark's payload. Furthermore, ad inserter 170 can generate targeting information based on any other suitable information. Ad inserter 170 can then use the targeting information to query ad placement server 190 for an advertisement. Ad placement server 190 can process the targeting information and return to ad inserter 170 an advertisement that matches the targeting information. Based on the information in the payload, ad inserter 170 can then determine that the advertisement is to be presented during a predetermined period of time or starting at a predetermined number of frames from the present frame (e.g., in the fifth subsequent frame). Upon the occurrence of the predetermined period of time or the predetermined frame, ad inserter 170 can cause the advertisement to be presented instead of the media content. This advertisement can be provided from any suitable source, such as the ad placement server, storage of the ad inserter, storage of the playback device, from a remote storage or device not shown, and/or any other suitable location.

Figure 2:
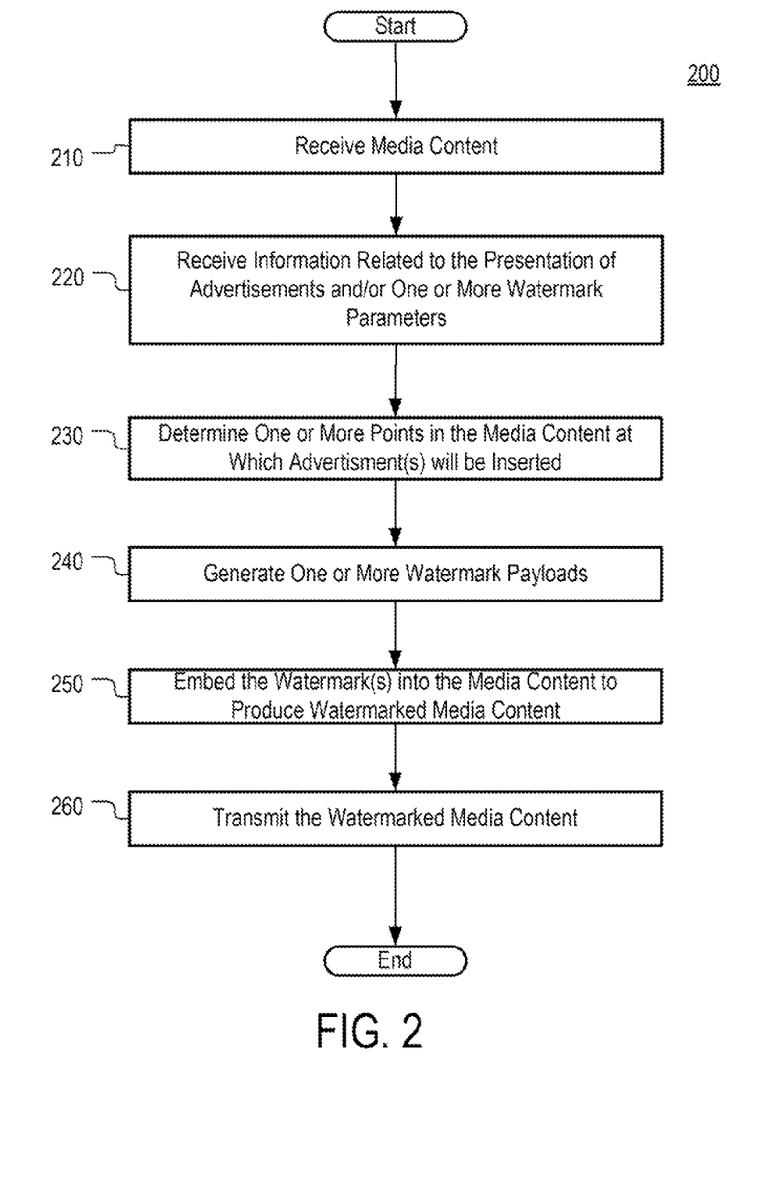
FIG. 2 is a flowchart of an example of a process for embedding a watermark in media content in accordance with some implementations of the disclosed subject matter.

Turning to FIG. 2, a flowchart of an example 200 of a process for embedding one or more watermarks in media content to produce watermarked media content in accordance with some implementations is shown. In some implementations, process 200 can be performed by watermark embedder 120 as shown in, and described in connection with, FIG. 1. In particular, process 200 can be performed by a hardware processor that is part of watermark embedder 120.

As illustrated, media content to be watermarked can be received at 210. The media content can be received from content publisher 110 or any other suitable source, and the media content can be received in any suitable format and in any suitable manner in some implementations.

At 220, information related to the presentation of advertisement and/or one or more watermark parameters can be received. Any suitable information and/or watermark parameters can be received. For example, the information and/or watermark parameters can indicate:

P1: A position (e.g., a frame, a point in time, etc.) in the media content at which a watermark is to be inserted (e.g., a 2-byte sequence number identifying a frame at which the watermark is to be inserted);
P2: An identifier of an advertisement (e.g., which can be expressed as a 2-byte integer);
P3: A keyword (e.g., a keyword that is to be used in selecting an advertisement);
P4: Duration (length) of the advertisement and/or how much time (length) of a current advertisement remains (e.g., which each can be expressed as a 1-byte identifier of the size of a sequence of frames in increments of 5 seconds);
P5: A time at which a playback of the advertisement is to begin (e.g., several frames after receipt of a watermarked frame, an absolute time (e.g., 18:15:30.00), etc.);
P6: An instruction for playback device 160 or ad inserter 170 to perform (e.g., "start output of advertisement" or "stop output of advertisement");
P7: A price, weight, rate, etc. that is charged to an advertiser for a presentation of the advertisement;
P8: An identifier of the advertiser;
P9: An identifier of an entity that requested placement of a watermark into the content (e.g., content publisher 110);
P10: An identifier of a product that is being advertised; and
P11: An advertisement status indicator (e.g., an indicator that an advertisement starts at a future frame, that an advertisement starts at the current frame, that an advertisement should be being presented during the current frame, that an advertisement finishes at the current frame, etc.)

At 230, process 200 can determine one or more points in the media content at which advertisement(s) will be inserted. This determination can be made in any suitable manner. For example, in some implementations, DPI data associated with the media content can be used to identify points in time at which advertisements can be inserted.

At 240, one or more watermark payloads can be generated. These payloads can include any suitable data that can be used to control the insertion of an advertisement at an ad inserter (such as ad inserter 170 of FIG. 1). Additionally or alternatively, these payloads can include any suitable parameter information to be encoded into a payload of the watermark (e.g., such as an advertisement targeting keyword, a length of the advertisement, etc.). For example, in some implementations, these payloads can include one or more of parameters P1 through P11 above.

At 250, one or more watermarks can be embedded in the media content. The one or more watermarks can be embedded in any suitable manner, and at any suitable location(s). For example, in some implementations, the watermark can be embedded using a technology not susceptible to decode/re-encode processing, using a technology that allows the watermark to be detected in one frame, by modifying portions of the audio and/or the video of the media content, by altering one or more portions (e.g., pixels of video, frequencies of audio, etc.) that are part of a single frame or a plurality of frames of the video and/or audio of the media content, in such a way that it is invisible, or inaudible, to the viewer or listener, and/or by using any other suitable techniques. The frame(s) at which each watermark is embedded can be selected based on information and/or parameters received at 220, and/or any other suitable information.

In some implementations, each watermark can have a different payload than other watermarks in the media content. For example, in some implementations, a watermark can be embedded in a frame of video to indicate (e.g., using a status indicator) that an advertisement is to be inserted in a specified number of frames (e.g., which number can be specified in the payload) from the frame. Such a watermark can permit an ad inserter to determine ahead of time that it should identify and prepare to insert an advertisement. As another example, in some implementations, a watermark can be embedded in a frame of video to indicate (e.g., using a status indicator) that an advertisement is to be inserted starting at the frame. As yet another example, in some implementations, a series of watermarks can be embedded in a corresponding series of frames to indicate (e.g., using a status indicator) that an advertisement should be inserted at each frame of the series of frames. Such watermarks can permit an ad inserter to determine that it should immediately begin inserting an advertisement if one is not presently being inserted (e.g., such as when a viewer begins watching media content (e.g., by changing channels) while an advertisement should be being presented), and, that upon an end of such watermarks being present in a series of frames, the advertisement should end. And, as yet another example, in some implementations, a watermark can be embedded in a frame to indicate (e.g., using a status indicator) that an advertisement should end at the frame. Such a watermark can permit an ad inserter to determine that it should stop inserting an advertisement after the present frame if the advertisement is currently being inserted.

At 260, the watermarked media content can be transmitted by process 200 to any suitable destination, such as content distributor 140. This transmission can be performed in any suitable manner. For example, this transmission can be performed as described above in connection with FIG. 1.

In some implementations, process 200 can be performed as part of a streaming (e.g., broadcasting) of media content by content publisher 110. In such implementations, frames of the media content can arrive at the device performing process 200 as frames are being transmitted by the device and subsequently output on playback device 160.

Figure 3:
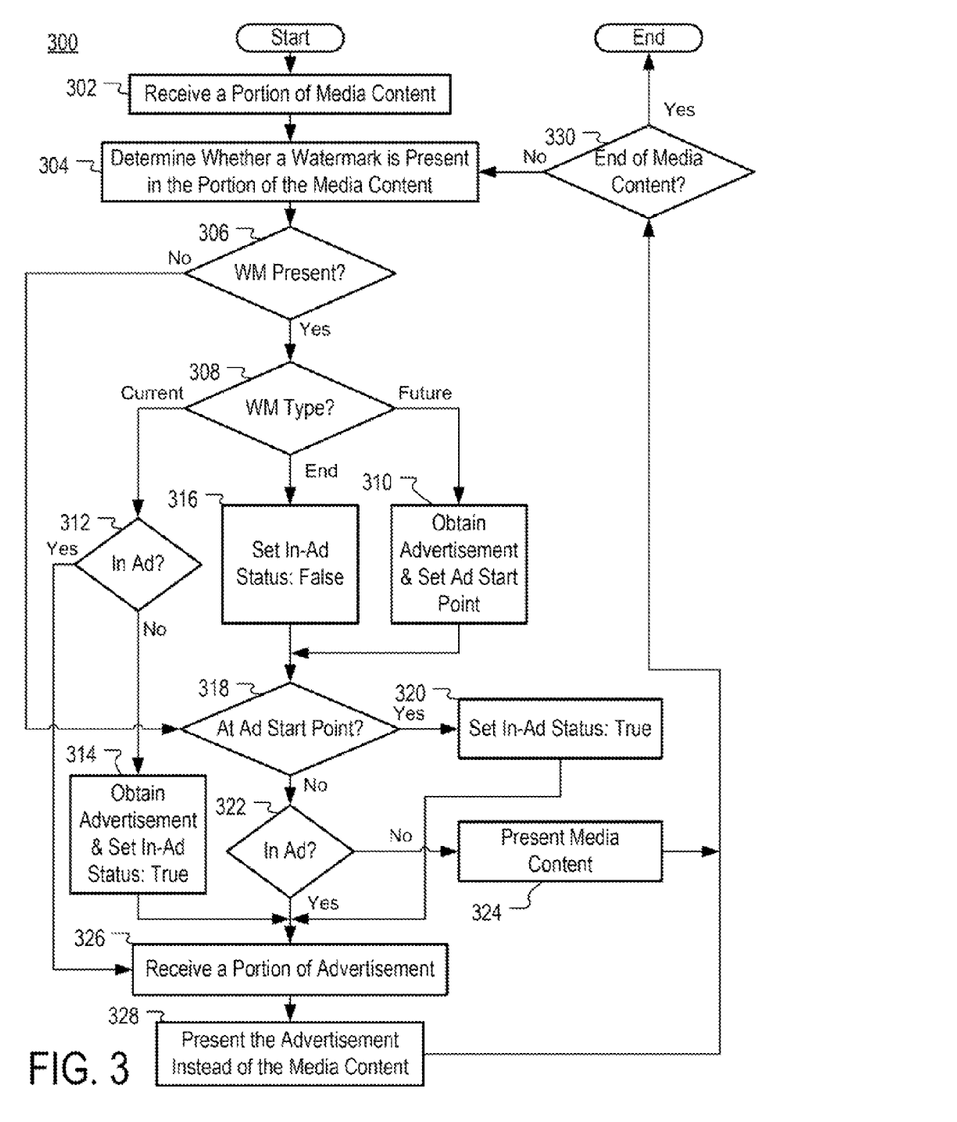
FIG. 3 is a flowchart of an example of a process for presenting an advertisement based on a watermark embedded in media content in accordance with some implementations of the disclosed subject matter.

FIG. 3 is a flowchart of an example 300 of a process for presenting advertisements based on the presence of watermarks in media content in accordance with some implementations of the disclosed subject matter. In some implementations, process 300 can be performed by ad inserter 170 and/or by playback device 160 (shown in, and described in connection with, FIG. 1). In particular, process 300 can be performed by one or more hardware processors that are part of ad inserter 170 and/or playback device 160, in some implementations.

As shown, at 302, process 300 can receive a portion of media content. This portion of media content can be received in any suitable manner and from any suitable source. For example, the media content can be received as described above in connection with FIG. 1. As another example, in some implementations, this media content can be received as analog signals, such as component video signals, composite video signals, component audio signals, composite audio signals, signals that carry both video and audio, and/or any other suitable signals. As yet another example, in some implementations, the media content can be received as digital signals, such as high definition multimedia interface (HDMI) signals and/or any other suitable signals. As noted above, such signals can be either compressed or uncompressed.

The portions of media content can have any suitable size. For example, in some implementations, the media content can be received in frame portions. More particularly, for example, the media content can be received as a series of one or more frames of video and/or audio.

Next, at 304, process 300 can determine whether a watermark is present in the received portion of media content. This determination can be made in any suitable manner. For example, if a watermark is created by altering certain pixels in each frame of video of the media content, this determination can be made by examining those pixels to determine if they have been altered. At 306, based on whether it is determined at 304 that a watermark is present, process 300 can branch to 308 (if the watermark is determined to be present ("Yes" at 306)) or 318 (if the watermark is determined to not be present ("No" at 306)).

At 308, process 300 can then determine a type of watermark that is present. This determination can be made in any suitable manner. For example, in some implementations, this determination can be made based on a status indicator in a payload of the watermark, a format of the watermark, a manner of implementation of the watermark, a location of the watermark, etc.

If it is determined at 308 that the watermark indicates that an advertisement is to be presented in the future, process 300 can branch to 310 at which it can obtain an advertisement and set an advertisement start point. For example, a payload of a watermark can indicate that the watermark corresponds to a future advertisement and that that advertisement is to begin being presented in five frames. In response, process 300 can obtain the advertisement for presentation and set a start point for the advertisement in five frames from the present frame.

Process 300 can obtain an advertisement in any suitable manner. For example, in some implementations, process 300 can retrieve a default advertisement from memory and/or storage. As another example, process 300 can retrieve from a storage device an advertisement based on the payload of the watermark (e.g., using an advertisement identifier in the payload, using a keyword in the payload, etc.). As yet another example, process 300 can retrieve an advertisement from an ad placement server (e.g., such as ad placement server 190). More particularly, for example, process 300 can identify one or more pieces of targeting data (e.g., targeting keywords or other targeting information (e.g., from the watermark and/or any other suitable source)) related to the advertisement, place a request for an advertisement based on the one or more pieces of targeting data to an ad placement server, and receive from the ad placement server an advertisement selected based on the targeting data in response to the request.

If it is determined at 308 that the watermark indicates that an advertisement should be being presented at the time of the current portion of the media content, process 300 can branch to 312 at which the process can determine whether it is currently inserting an advertisement. This determination can be made on any suitable basis, such as by checking an "In Ad?" flag as set and cleared as described below. If it is determined at 312 that process 300 is currently inserting an advertisement, the process can branch 326 to receive a portion of an advertisement as described below. Otherwise, process 300 can branch to 314 at which it can obtain an advertisement and set an "In Ad?" flag to true. Process 300 can obtain an advertisement at 314 in any suitable manner, such as that described above in connection with 310.

If it is determined at 308 that the watermark indicates that an advertisement should end at the time of the current portion of the media content, process 300 can branch to 316 at which the process can set the "In Ad?" flag to false.

At 318, after determining at 306 that a watermark is not present, after setting the "In Ad?" flag to false at 316, or after obtaining an advertisement and setting the advertisement start point at 310, process 300 can determine whether it is at the advertisement start point. This determination can be made in any suitable manner. For example, in some implementations, this determination can be made by comparing the present frame and/or time to a frame and/or time specified in the advertisement start point set at 310. If the process is at the advertisement start point, process 300 can set the "In Ad?" flag to true at 320. Otherwise, process 300 can proceed to 322.

At 322, process 300 can determine whether it is currently inserting an advertisement. This determination can be made on any suitable basis, such as by checking the "In Ad?" flag. If "In Ad?" flag is false, process 300 can cause the portion of the media content received at 302 to be presented at 324. The portion of the media content can be caused to be presented in any suitable manner. For example, in some embodiments, the process can deliver the portion of the media content to a mechanism for presenting media content and/or advertisements. As another example, in some embodiments, the process can allow the portion of the media content to be presented by another mechanism without interference. Otherwise, if the "In Ad?" flag is true, process can proceed to 326.

At 326, after determining that the "In Ad?" flag is true at 312, after obtaining an advertisement and setting an "In Ad?" flag to true at 314, after setting an "In Ad?" flag to true at 320, or after determining that the "In Ad?" flag is set to true at 322, process 300 can receive a portion of the advertisement at 326. This portion of the advertisement can be received in any suitable manner. For example, this portion can be received from an advertisement obtained as described above. The portion of the advertisement received at 326 can be the same size as the portion of the media content received at 302 in some implementations. Next, at 328, process 300 can cause the portion of the advertisement received at 326 to be presented in any suitable manner. For example, in some implementations, the process can deliver the portion of the advertisement instead of the portion of the media content to a mechanism for presenting media content and/or advertisements.

After the portion of the media content or the portion of the advertisement has been caused to be presented at 324 or 328, respectively, process 300 can determine at 330 whether the end of the media content has been reached. If it is determined that the end has not been reached, process 300 can loop back to 304. Otherwise, process 300 can end.

In accordance with some implementations, any suitable hardware and/or software can be used to perform the mechanisms described herein (such as those illustrated in, and described in connection with, FIGS. 1-3). For example, one or more general purpose devices, such as a computer, or special purpose devices, such as a client, a server, a set-top box, a digital tuner, a streaming media player, a Blu-ray player, a digital video disc (DVD) player, a television, a gaming console, etc., can be used to execute software for performing the mechanisms described herein. Any of these general or special purpose devices can include any suitable components, such as a hardware processor, memory, one or more communications interfaces, and a communications bus.

Figure 4:
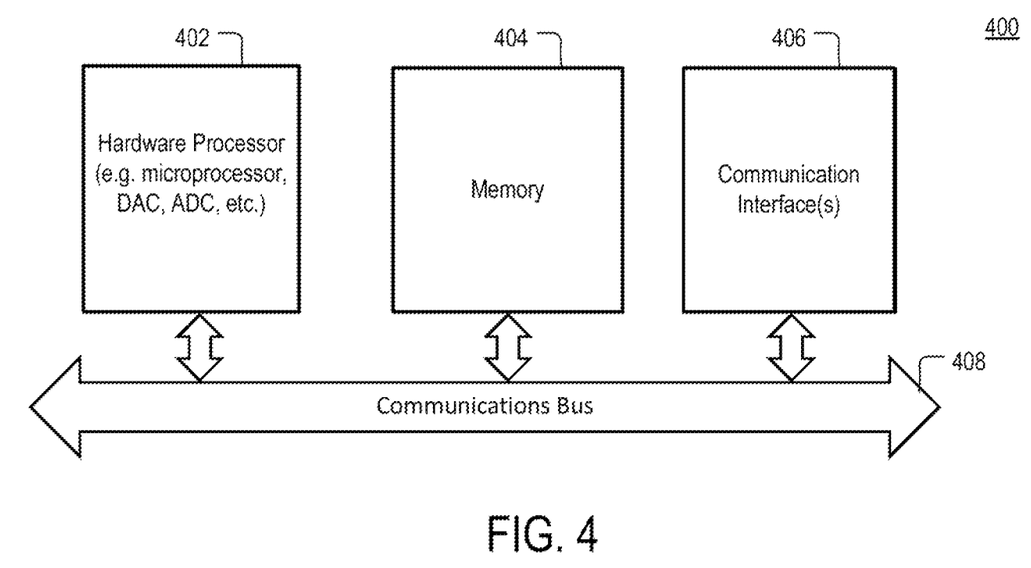
FIG. 4 is a block diagram of an example of hardware for a device for presenting advertisements in accordance with some implementations of the disclosed subject matter.

For example, as illustrated in FIG. 4, an example 400 of hardware that can be used in such general or special purposes devices is shown. As illustrated, hardware 400 can include a hardware processor 402, memory 404, one or more communication interfaces 406, a communications bus 408, and/or any other suitable components.

Hardware processor 402 can be any suitable processing device, and can include one or more microprocessors, microcontrollers, digital signal processors, programmable logic devices, field-programmable gate arrays (FPGAs), application-specific integrated circuits (ASICs), etc., and can include a multi-core processor (e.g., dual-core, quad-core, hexa-core, or any suitable number of cores) or a supercomputer, in some implementations.

Memory 404 can be any volatile or non-volatile memory (e.g., RAM, a solid state drive (SSD), a hard disk).

Communications interface(s) 406 can include any suitable communication interfaces. For example, in some implementation, communications interface(s) 406 can include one or more communications network adapters that can enable the hardware and/or the software to communicate with other communications networks (e.g., such as the Internet, wired networks, or wireless networks), other equipment, and/or any other suitable networks, devices, etc.

Communications bus 408 can be any suitable communications bus for allowing two or more of hardware processor 402, memory 404, communications interface(s) 406, and/or any other suitable components to communicate and/or convey control, address, and/or data signals.

This hardware can be implemented as part of any of content publisher 110, watermark embedder 120, content distributor 140, decoder 150, playback device 160, ad inserter 170, and ad placement server 190.

Hardware processor 402 can be configured to perform one or more of the steps discussed with respect to processes 200 and 300, in some implementations.

In some implementations, any suitable computer readable media can be used for storing instructions for performing the processes described herein. For example, in some implementations, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

FIGS. 2 and 3 are provided as examples only. In some implementations, one or more of the steps can be performed in a different order than that represented, performed concurrently, or omitted.

The provision of the examples described herein (as well as clauses phrased as "such as," "e.g.," "including," and the like) should not be interpreted as limiting the claimed subject matter to the specific examples; rather, the examples are intended to illustrate only some of many possible aspects.

Although the invention has been described and illustrated in the foregoing illustrative implementations, it is understood that the present disclosure has been made only by way of example, and that numerous changes in the details of implementation of the invention can be made without departing from the spirit and scope of the invention, which is limited only by the claims which follow. Features of the disclosed implementations can be combined and rearranged in various ways.

What is claimed is:

1. A system for presenting advertisements, comprising:
at least one hardware processor that:
causes a channel of media content to be changed from a first channel to a second channel at a channel change time;
receives media content corresponding to the second channel containing a video portion and/or an audio portion;
determines whether a watermark is embedded in at least one of the video portion and/or the audio portion of the media content; and
if it is determined that the watermark is embedded in the at least one of the video portion and/or the audio portion of the media content:
identifies a payload in the watermark;
receives an advertisement selected at least in part based on the payload;
determines that the advertisement should have already started being presented prior to the channel change time based on the payload; and
causes a portion of the advertisement to be presented instead of the media content as if the advertisement had been being presented at the channel change time.

2. The system of claim 1, wherein the at least one hardware processor determines whether the watermark is embedded based on values of one or more pixels in the video portion of the media content.

3. The system of claim 1, wherein the at least one hardware processor determines whether the watermark is embedded based on values of one or more audio samples in the audio portion of the media content.

4. The system of claim 1, wherein the at least one hardware processor selects the advertisement based at least in part on an advertisement identifier in the payload.

5. The system of claim 1, wherein the at least one hardware processor also receives the advertisement from a server.

6. The system of claim 1, wherein the at least one hardware processor determines that another watermark that indicates that another advertisement is to be presented at a start point is embedded in the at least one of the video portion and/or the audio portion of the media content and causes the other advertisement to be presented instead of the media content beginning at the start point.

7. The system of claim 1, wherein the at least one hardware processor also:
determines a first time point at which to begin presentation of the advertisement at least in part based on the payload;
determines a second time point at which to stop presentation of the advertisement at least in part based on the payload; and
causes the advertisement to be presented beginning at the first time point and ending at the second time point.

8. A method for presenting advertisements, comprising:
causing a channel of media content to be changed from a first channel to a second channel at a channel change time;

receiving media content corresponding to the second channel containing a video portion and/or an audio portion;

determining, using a hardware processor, whether a watermark is embedded in at least one of the video portion and/or the audio portion of the media content; and if it is determined that the watermark is embedded in the at least one of the video portion and/or the audio portion of the media content:

identifying a payload in the watermark;

receiving an advertisement selected at least in part based on the payload;

determining that the advertisement should have already started being presented prior to the channel change time based on the payload; and causing a portion of the advertisement to be presented instead of the media content as if the advertisement had been being presented at the channel change time.

9. The method of claim 8, wherein the determining of whether the watermark is embedded is based on values of one or more pixels in the video portion of the media content.

10. The method of claim 8, wherein the determining of whether the watermark is embedded is based on values of one or more audio samples in the audio portion of the media content.

11. The method of claim 8, wherein the advertisement is selected based at least in part on an advertisement identifier in the payload.

12. The method of claim 8, further comprising receiving the advertisement from a server.

13. The method of claim 8, further comprising determining that another watermark that indicates that another advertisement is to be presented at a start point is embedded in the at least one of the video portion and/or the audio portion of the media content and wherein the causing the other advertisement to be presented instead of the media content causes the advertisement to begin at the start point.

14. The method of claim 8, further comprising:

determining a first time point at which to begin presentation of the advertisement at least in part based on the payload;

determining a second time point at which to stop presentation of the advertisement at least in part based on the payload; and causing the advertisement to be presented beginning at the first time point and ending at the second time point.

15. A non-transitory computer-readable medium containing computer-executable instructions that, when executed by a processor, cause the processor to perform a method for presenting advertisements, the method comprising:

causing a channel of media content to be changed from a first channel to a second channel at a channel change time;

receiving media content corresponding to the second channel containing a video portion and/or an audio portion;

determining whether a watermark is embedded in at least one of the video portion and/or the audio portion of the media content; and if it is determined that the watermark is embedded in the at least one of the video portion and/or the audio portion of the media content:

identifying a payload in the watermark;

receiving an advertisement selected at least in part based on the payload; and determining that the advertisement should have already started being presented prior to the channel change time based on the payload; and causing a portion of the advertisement to be presented instead of the media content as if the advertisement had been being presented at the channel change time.

16. The non-transitory computer-readable medium of claim 15, wherein the determining of whether the watermark is embedded is based on values of one or more pixels in the video portion of the media content.

17. The non-transitory computer-readable medium of claim 15, wherein the determining of whether the watermark is embedded is based on values of one or more audio samples in the audio portion of the media content.

18. The non-transitory computer-readable medium of claim 15, wherein the advertisement is selected based at least in part on an advertisement identifier in the payload.

19. The non-transitory computer-readable medium of claim 15, wherein the method further comprises receiving the advertisement from a server.

20. The non-transitory computer-readable medium of claim 15, wherein the method further comprises determining that another watermark that indicates that another advertisement is to be presented at a start point is embedded in the at least one of the video portion and/or the audio portion of the media content and wherein the causing the other advertisement to be presented instead of the media content causes the advertisement to begin at the start point.

21. The non-transitory computer-readable medium of claim 15, wherein the method further comprises:

determining a first time point at which to begin presentation of the advertisement at least in part based on the payload;

determining a second time point at which to stop presentation of the advertisement at least in part based on the payload; and causing the advertisement to be presented beginning at the first time point and ending at the second time point.

\* \* \* \* \*